United States Patent [19]

Brooks

[11] 4,106,966
[45] Aug. 15, 1978

[54] METHOD OF MAKING TOOTHED ENDLESS POWER TRANSMISSION BELTS

[75] Inventor: Alden W. Brooks, Springfield, Mo.

[73] Assignee: Dayco Corporation, Dayton, Ohio

[21] Appl. No.: 799,012

[22] Filed: May 20, 1977

[51] Int. Cl.² .................. B29H 7/22; F16G 1/00
[52] U.S. Cl. ....................... 156/138; 156/140; 156/141; 156/189; 156/244.12
[58] Field of Search ............ 156/137, 138, 139, 140, 156/141, 189, 244; 74/231 R, 232, 233, 234

[56] References Cited

U.S. PATENT DOCUMENTS

| | | | |
|---|---|---|---|
| 2,337,985 | 12/1943 | Freedlander | 156/138 |
| 2,773,540 | 12/1956 | Waugh | 156/138 |
| 3,839,116 | 10/1974 | Thomas et al. | 156/140 |

*Primary Examiner*—Caleb Weston
*Attorney, Agent, or Firm*—Reuben Wolk

[57] ABSTRACT

A method of making endless power transmission belts each having at least a toothed outside surface is provided by building a belt sleeve on a drum and providing a reusable tubular polymeric curing jacket having a toothed inside surface around the sleeve with the teeth thereof adjacent the sleeve and curing the sleeve with the jacket therearound while subjecting the jacket to pressure such that the toothed inside surface of the jacket defines corresponding outside teeth on the sleeve; and, upon cooling the jacket and sleeve such jacket is readily removed for reuse thereby substantially reducing the cost of providing a toothed outside surface on a belt sleeve and belts defined therefrom.

13 Claims, 13 Drawing Figures

METHOD OF MAKING TOOTHED ENDLESS POWER TRANSMISSION BELTS

BACKGROUND OF THE INVENTION

Toothed endless power transmission belts including such belts which have toothed inside surfaces, toothed outside surfaces, and so-called double toothed surfaces defined by inside as well as outside surfaces are known and used in industry. However, the cost to make belts having double toothed surfaces is substantial and in the highly competitive belt industry a manufacturer that can provide such belts at minimum cost has a decided advantage in the marketplace.

SUMMARY

It is a feature of this invention to provide a simple and economical method of making an endless power transmission belt having at least a toothed outside surface.

Another feature of this invention is to provide a simple and economical method of making an endless power transmission belt having a toothed inside surface and a toothed outside surface.

Another feature of this invention is to provide a method of making an endless power transmission belt of the character mentioned by employing a reusable tubular polymeric curing jacket having a toothed inside surface which enables the provision of teeth in a belt sleeve at minimum cost.

Another feature of this invention is to provide an improved method of making endless power transmission belts each having at least a toothed outside surface comprising the steps of building a belt sleeve on a drum, providing a reusable tubular polymeric curing jacket having a toothed inside surface around the sleeve with the teeth thereof being disposed adjacent such sleeve, curing the sleeve with the jacket therearound while subjecting the jacket to pressure causing the inside teeth thereof to define corresponding outside teeth on the sleeve, removing the jacket from around the drum for reuse thereof, and cutting the sleeve to define the belts. Depending on the material used, the sleeve may be cooled before removing from the drum.

Accordingly, it is an object of this invention to provide an improved method of making endless power transmission belts having one or more of the novel features set forth above or hereinafter shown or described.

Other details, features, objects, uses, and advantages of this invention will become apparent from the embodiments thereof presented in the following specification, claims, and drawings.

BRIEF DESCRIPTION OF THE DRAWINGS

The accompanying drawings show present preferred embodiments of this invention, in which.

DETAILED DESCRIPTION

Figure 12:
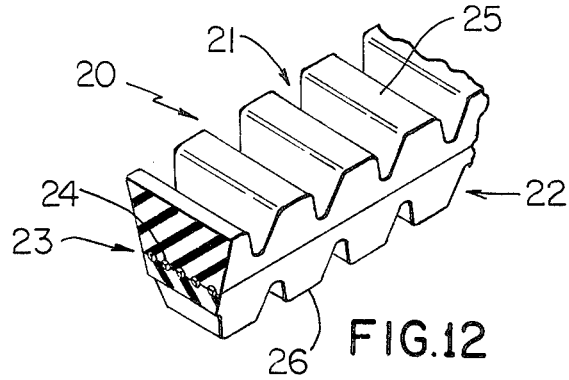
FIG. 12 is a fragmentary perspective view of a belt cut from the sleeve of FIG. 11.

Reference is now made to FIG. 12 of the drawing which illustrates one exemplary embodiment of an endless power transmission belt 20 made in accordance with the method of this invention and such belt has at least a toothed outside surface which is designated generally by the reference numeral 21 and in this example belt 20 has a toothed inside surface 22 in addition to its toothed outside surface 21. The belt 20 has a load-carrying section which is designated by the reference numeral 23 and is comprised of a helically wound load-carrying cord 24 which is arranged centrally within the belt when viewing the belt in cross section, i.e., a line drawn through the centers of each turn of the helically wound cord at any cross section along the length of the belt 20 is disposed centrally or midway between the inside and outside surface of the belt at the particular cross section whereby such a belt is popularly referred to as having a central neutral axis or as being a CNA belt. However, it should be understood that the exact central location is theoretical, and that slight variations may exist from such exact central location.

The belt 20 has a toothed outside surface 25 which defines the outer surface of its toothed tension section 21 and has a toothed inside surface 26 which defines the outer surface of its toothed compression section 22 whereby the exemplary belt 20 is, in essence, a double-toothed CNA belt and is used in applications where optimum longitudinal flexibility is required. The belt 20 is made in accordance with the method of this invention with optimum economy as will now be described in detail.

A step of the method of this invention involves making a comparatively high strength reusable tubular polymeric jacket 30 which has a toothed inside surface 31, see FIG. 7, and such jacket 30 may be made utilizing several techniques a few exemplary ones of which will now be described in detail. However, regardless of which technique is employed to make the jacket 30, it is preferably in the form of a homogenous mass capable of withstanding curing temperatures, as will be explained later, and capable of being reused without damage thereto. The term "high strength" is used to mean that the jacket has sufficient strength to be cohesive and to permit repeated use.

Figure 1:
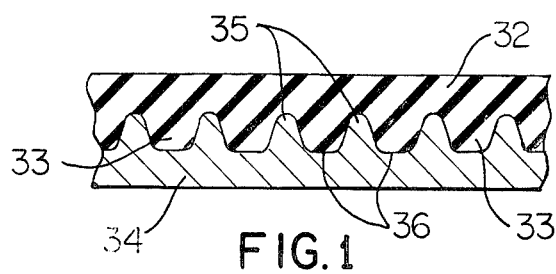
FIG. 1 is a fragmentary cross-sectional view illustrating a preparation step of forming a toothed polymeric strip which is employed in making a reusable tubular polymeric curing jacket which comprises the method of this invention.

As a step of the method of this invention, a polymeric strip 32 having teeth 33 therein may be defined (FIG. 1) employing a flat plate 34 having alternating projections 35 and recesses 36 therein which define the polymeric strip 32 with its teeth 33. The plate 34 may be made of any suitable material such as a metal or polymeric material and used in a press of known construction by merely placing a polymeric substance, such as a strip of uniform thickness, in position upon the plate 34 and urging such polymeric substance against the plate 34 in accordance with techniques known in the art and under heat and pressure conditions to define the toothed polymeric strip 32. The polymeric substance may be any suitable inexpensive material and the strip is formed and cured in the press and then suitably cooled for later use, now to be described.

Figure 2:
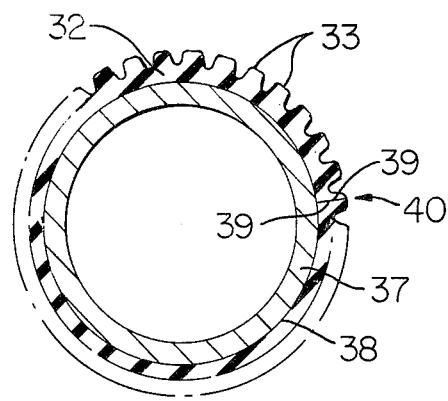
FIG. 2 is a cross-sectional view illustrating the toothed strip of FIG. 1 wrapped around a buildup mandrel.

The completed (formed, cured, and cooled) toothed strip 32 is then wrapped on a buildup mandrel 37 having a right circular cylindrical outside surface 38 and so that opposed end edges 39 of the strip 32 are disposed in adjoining relation as shown at 40 in FIG. 2 and using any suitable joint such as a butt joint.

Figure 3:
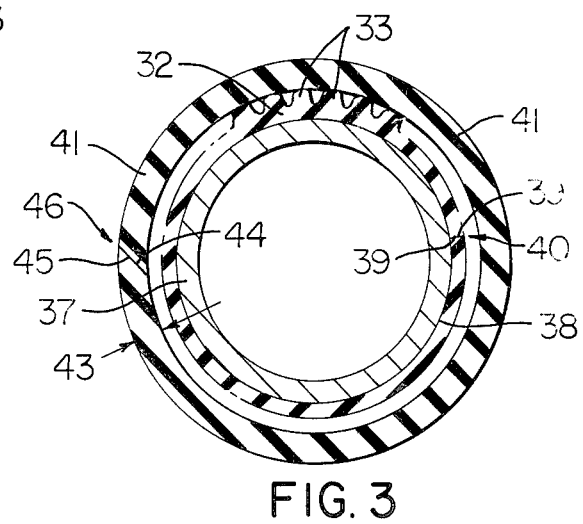
FIG. 3 is a cross-sectional view (with only a few representative teeth of the toothed strip shown) illustrating a step of the method wherein a polymeric material is disposed around the toothed strip to define a thickness of such material.

A polymeric material 41 is then disposed around the toothed strip 32 after placing such strip on the mandrel as shown in FIG. 2; and, the disposal of the polymeric material is illustrated in FIG. 3. The polymeric material 41 of FIG. 3 is shown as a single thickness 43 thereof; and, such single thickness polymeric material has opposite end edges 44 and 45 which are adjoined on a bevel joint 46.

Figure 7:
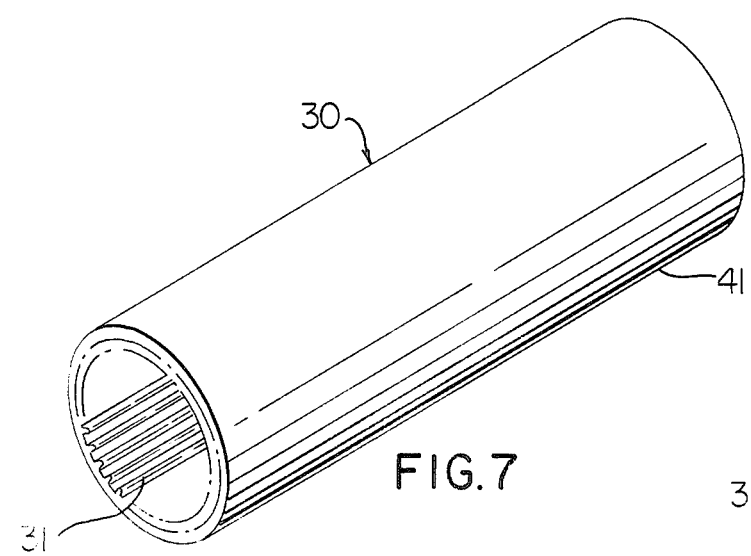
FIG. 7 is a perspective view illustrating a reusable polymeric curing jacket having a toothed inside surface (with only a few representative teeth shown by solid lines) and regardless of whether the jacket of FIG. 7 is defined by the steps disclosed in FIGS. 1–3, 4, 5, or 6.

The polymeric material 41 as disposed on the toothed strip 32, which was in turn disposed on the mandrel 37, with the toothed strip 32 therearound, is then suitably wrapped and cured in accordance with techniques which are known in the art (and thus such techniques will not be described) to define the tubular polymeric curing jacket 30 illustrated in FIG. 7. The manner in which the polymeric curing jacket 30 is employed in the method of this invention will be described in detail subsequently.

Figure 4:
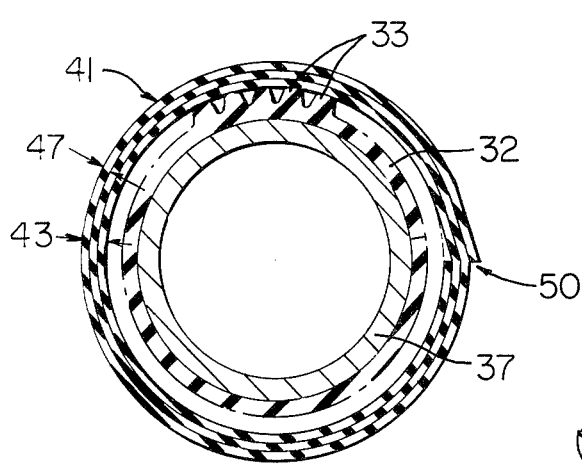
FIG. 4 is a view similar to FIG. 3 illustrating a modification of the method comprising winding a comparatively thin ribbon of polymeric material in a plurality of turns around the toothed strip to define a thickness thereof.

The polymeric jacket 30 need not necessarily be made employing a single thickness 43 of polymeric material 41 as shown in FIG. 3 but such polymeric material 41 may be defined by winding a strip or ribbon of polymeric material, also designated generally by the reference numeral 41, in a plurality of turns as shown in FIG. 4 to again define a thickness 43. The ribbon of polymeric material is comparatively thin having a thickness 47. Once the ribbon is wound to define the overall thickness 43 the assembly as defined in FIG. 4 is wrapped, cured, and cooled to define the polymeric curing jacket 30 which is identical to the jacket 30 illustrated in FIG. 7.

It will be appreciated that in the case of the single thickness polymeric material 41 illustrated in FIG. 3 the opposite end edges 44 and 45 joined on the bevel joint 46 flow smoothly together during curing to define a substantially homogenous tubular mass whereby the joint 46 cannot be discerned. Similarly, in the process of curing the thickness 43 defined by the plurality of turns each having a thickness 47 the interfaces between turns flow smoothly together defining a tubular homogenous mass free of tubular interfaces. Further the material is such that the overlapping illustrated at 50 cannot be discerned simply because the material flows together to define the jacket 30 having the smooth right circular cylindrical outside surface and the toothed inside surface 31 as defined by the toothed strip 32.

By employing a toothed plate 34 and the technique of making a toothed polymeric strip 32 which is then wrapped on a mandrel 37, it is possible to provide a desired tooth form in applications where the total quantity of belts to be produced is comparatively small, i.e., not mass production quantities. Accordingly, a toothed strip 32 may be made sufficient in length to be placed on any diameter mandrel to thereby define endless power transmission belts of different lengths with optimum economy.

Figure 5:
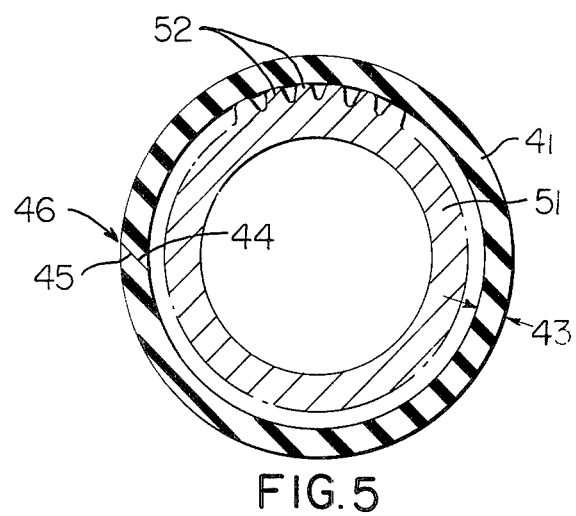
FIG. 5 is a view similar to FIG. 3 illustrating another modification of the method comprising disposing of a polymeric material around a toothed buildup drum.

However, it will be appreciated that in applications where mass production quantities of a particular size of endless power transmission belts are to be defined a polymeric material 41 may be wrapped on a mandrel 51, as shown in FIG. 5, having a toothed outside surface 52. The polymeric material 41 disposed around mandrel 51 may be of uniform thickness 43 having opposite end edges 44 and 45 which are again joined on a bevel joint 46. The construction thus defined may then be suitably wrapped, cured, and cooled utilizing techniques which are known in the art to define the toothed curing jacket 30 having a toothed inside surface 31. It will also be appreciated that instead of a single thickness polymeric material 41 as shown in FIG. 5 a plurality of turns of a ribbon-like material, as shown in FIG. 4, may be provided on toothed mandrel 51.

Figure 6:
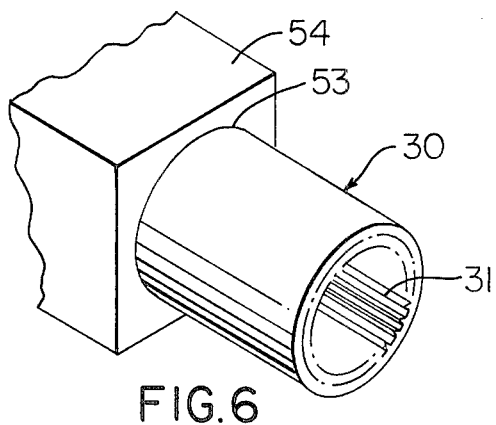
FIG. 6 is a fragmentary perspective view illustrating the forming of a reusable tubular polymeric curing jacket having a toothed inside surface (with only a few representative teeth shown by solid lines) by extruding such jacket employing an extrusion die.

In applications where endless power transmission belts of a particular length are to be made in mass production quantities, the polymeric jacket 30 may be defined as shown in FIG. 6 whereby a suitable polymeric material 41 defining the jacket 30 may be extruded through an extrusion orifice 53 in an extrusion die 54 which comprises part of an extrusion apparatus of any type known in the art. In this instance, the polymeric jacket 30 with its toothed inside surface 31 is defined in a single step and it will be appreciated that such jacket is then cured and cooled in accordance with techniques known in the art to define the cylindrical jacket 30 of FIG. 7.

Figure 7A:
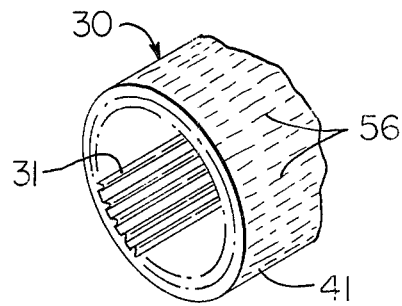
FIG. 7A is a fragmentary perspective view similar to and illustrating a modification of the jacket of FIG. 7.
Figure 8:
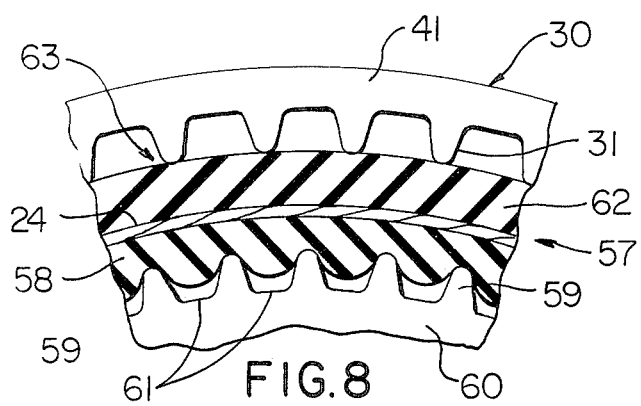
FIG. 8 is a fragmentary view with parts in elevation and parts in cross section particularly illustrating the curing jacket of FIG. 7 or FIG. 7A provided around a belt-defining sleeve and with the toothed inside surface of the jacket against such sleeve.

In providing a curing jacket 30 having a toothed inside surface 51, such jacket 30 may be provided with randomly disposed elongated reinforcing fibers 56 (see FIG. 7A) embedded in the polymeric material 41 which serves as a matrix for the fibers. The fibers 56 may be of any suitable type known in the art and may be in the form of non-metallic fibers. In addition, the fibers 56 have their longitudinal axes disposed parallel to the longitudinal axis of the jacket 30 whereby such fibers 56 impart longitudinal strength to the curing jacket 30 yet allow such jacket to be easily formed or compressed radially inwardly. With the jacket 30 having greater longitudinal strength it is more easily removed from around an associated belt sleeve in a non-damaging manner for an increased reuse life, i.e., may be reused a large number of (a dozen or more) times. The jacket 30 with fibers 56 may be made by suitably providing single thickness 43 with parallel fibers, ribbon of thickness 47 with parallel fibers, or extruded jacket 30 with fibers aligned in parallel relation during the extrusion process.

From the above description, it is apparent that the tubular polymeric curing jacket 30 with its toothed inside surface 31 may be made using several techniques. However, regardless of how defined and whether with or without reinforcing fibers 56, the jacket 30 is employed in the method of this invention to define a belt sleeve 57 from which a plurality of double-toothed CNA belts are cut.

The belt sleeve 57 of this example is made by wrapping a polymeric layer 58 against the teeth 59 of a build-up drum 60 and then helically winding a load-carrying cord 24 under controlled tension conditions, as is well known in the art, causing partial forcing of the layer 58 into the grooves 61 defined between the drum teeth 59. Another layer of polymeric material 62 is then disposed outwardly of and against the load-carrying cord 24 to define the outer part of sleeve 57 whereupon the curing jacket 30 is then disposed around the belt sleeve 57 with the teeth 31 thereof closely adjacent sleeve 57 and preferably with such teeth 31 thereagainst as shown at 63.

Figure 9:
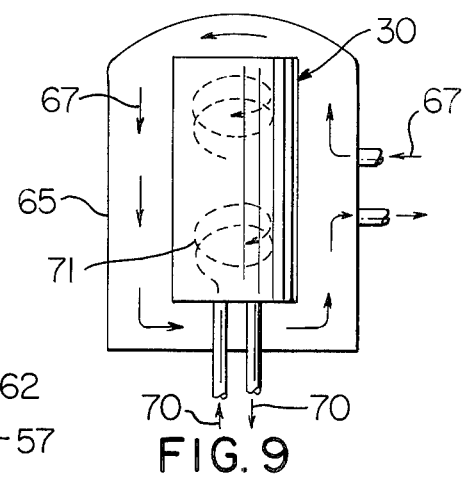
FIG. 9 is a schematic presentation illustrating the sleeve of FIG. 8 being cured in a curing device.
Figure 11:
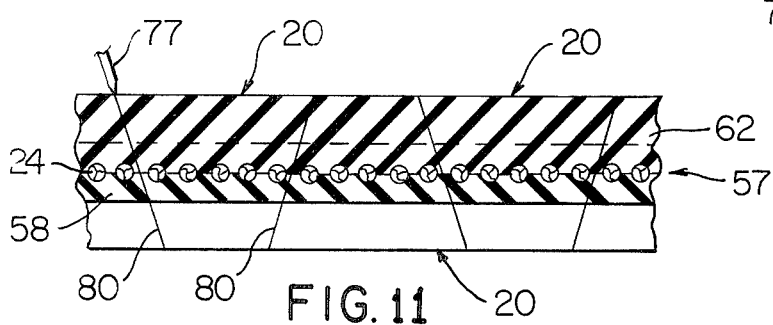
FIG. 11 is a cross-sectional view of a part of a cured and cooled belt sleeve defined in accordance with the method of this invention and having both a toothed inside surface and a toothed outside surface showing the manner in which such sleeve is cut to define a plurality of toothed endless power transmission belts each having teeth in both the inside and outside surfaces thereof.
Figure 10:
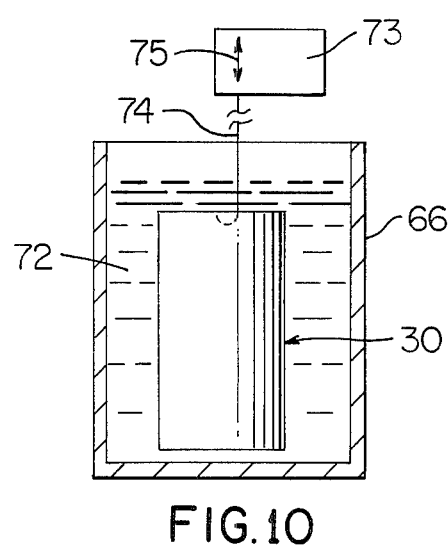
FIG. 10 is a schematic presentation illustrating the sleeve and curing jacket being cooled after the curing step of FIG. 9.

The sleeve 57 with its curing jacket 30 therearound is then suitably cured in a curing device 65 (see FIG. 9) while subjecting the jacket to pressure thereby causing the teeth 31 of such jacket to define corresponding outside teeth on the sleeve and, in essence, to define the toothed outside surface 25 thereof as shown in FIG. 11. The sleeve 57 and jacket 30 may then be suitably cooled in a cooling tank 66 as shown in FIG. 10 and then the jacket 30 and sleeve 57 are removed from the drum 60 and separated from each other whereupon jacket 30 is then reused in a similar manner as described above by employing same around another belt sleeve 57. The cooled sleeve 57 is then suitably cut as illustrated in FIG. 11 to define a plurality of double-toothed belts 20, one of which is shown in FIG. 12. The cooling step is desirable with certain cord materials, such as polyester; however, such cooling step is preferably omitted when a material such as glass or aramid is used to form the fibers 56.

The curing of the belt-defining or belt sleeve 57 is achieved in the curing apparatus or device 65 (FIG. 9) by placing the drum 60 with the belt sleeve 57 and curing jacket 30 therearound in such device 65. Curing is achieved by introducing steam, indicated by arrows 67, into and out of device 65 and circulating such steam around the jacket 30 and belt sleeve 57. The pressure of the steam 67 is such that it causes the teeth 31 of the curing jacket 30 to be embedded in the sleeve 57 and define the toothed outside surface 25 therein and in belts 20 defined from such sleeve. Steam, indicated by arrows 70, which is under a lower pressure than steam 67, is also introduced within the drum as illustrated at 71 causing substantial heating within the drum and curing of the belt sleeve 57 from its inside portion outwardly to supplement the curing from the outside portion inwardly as provided by the high pressure steam 67. The curing device 65 may be of any suitable type employed in the art and such a curing device may be in the form of a pot heater.

The cured sleeve 57 is then suitably cooled (FIG. 10) and in this example such sleeve 57 is cooled in the container 66 through which cold tap water 72 is continuously circulated. The cooling is achieved by submerging the drum 60 with the sleeve 57 and jacket 30 thereon in the water 72 by lowering the drum, sleeve, and jacket utilizing an actuating device or mechanism 73 which has a hook-like fastener 74 extending therefrom. The operation of the actuating device 73 is such that it can move the drum 60 and the belt sleeve 57 into and out of the cold tap water 72 as indicated by the double arrows 75.

The curing jacket 30 and sleeve 57 are then suitably removed from the drum and the sleeve 57 and the jacket 30 are separated whereby the curing jacket 30 is used again in a similar manner as described previously. The sleeve 57 is then cut as illustrated in FIG. 11.

The cutting of sleeve 57 may be achieved with such sleeve supported on a suitable supporting mandrel (not shown) which may be provided with means for rotating the same on centers and with a suitable cutting knife of known construction. The cutting knife 77 may be in the form of a rotatable circular cutting knife 77 which may be rotated by a suitable drive mechanism while rotating the mandrel on which the sleeve 57 is supported with the knife 77 in cutting engagement to provide the desired cutting action.

The cutting knife 77 is used to provide a plurality of balanced cuts along the length of the sleeve 57 and such cuts will be designated by the reference numeral 80 in FIG. 11. The balanced cuts 80 define non-parallel sides of toothed belts 20 each having a trapezoidal cross-sectional outline. As indicated earlier, the belts are double-toothed belts 20. The cuts 80 are inclined in alternating directions along the axial length of the sleeve 57 to define a plurality of belts 20 substantially without scrap losses. The cuts 80 are provided such that alternating belts 20 along the sleeve 57 upon being turned inside out are identical to the belts 20 which are maintained right side out without inversion.

In this example of the method of the invention, a reusable curing jacket 30 is made and employed in connection with the making of a double-toothed belt, i.e., belts 20 having toothed inside surfaces 26 and outside surfaces 25. However, it will be appreciated that the method of this invention may be employed to define belts each having only a toothed outside surface with the inside surface of each of such belts being plain or smooth, if desired.

Reference has been made in this disclosure of the invention to the curing of the belt sleeve 57 and it is to be understood that curing is used as a broad term which is intended to cover vulcanization of rubber compounds used in making the belt defining sleeve 57.

The material employed in making the curing jacket 30 may be any suitable material known in the art which is resilient in character and capable of being formed radially inwardly to define a corresponding toothed outside surface of an associated belt defining sleeve. Materials which may be employed for this purpose are butyl, halobutyl, ethylene-propylene rubbers such as EPDM, and silicone rubbers.

The belt sleeve 57 from which the belts 20 are defined is shown as being made free of covers, reinforcements (except for cord 24), and the like. However, it will be appreciated that such sleeve may be provided with fabric layers, reinforcing layers, outside covering layers, and the like depending upon the characteristics desired in the final belts made therefrom.

It will also be appreciated that with the curing jacket 30 being of a reusable variety, the overall cost of belts made using such jacket is reduced.

While present exemplary embodiments of the method of this invention have been illustrated and described, it will be recognized that this invention may be otherwise variously embodied and practiced within the scope of the following claims.

What is claimed is:

1. A method of making endless power transmission belts each having at least a toothed outside surface comprising the steps of, building a belt sleeve on a drum, extruding a polymeric material through an extrusion orifice to define a reusable cylindrical curing jacket having a toothed inside surface around said sleeve with the teeth thereof being disposed adjacent said sleeve, wherein the teeth comprising said toothed surface extend parallel to the longitudinal axis of said jacket, curing said sleeve with said jacket therearound while subjecting the jacket to pressure causing the inside teeth thereof to define corresponding outside teeth on said sleeve, removing said jacket from around said drum for reuse thereof, and cutting said sleeve to define said belts.

2. A method as set forth in claim 1 in which said curing jacket is made of a rubber compound.

3. A method as set forth in claim 1 in which said curing step comprises curing said sleeve with steam under controlled temperature and pressure, said steam pressure urging said inside teeth of said jacket against said sleeve to define said outside teeth on said sleeve.

4. A method as set forth in claim 1 and further comprising the step of cooling said sleeve and jacket prior to removal from said drum.

5. A method as set forth in claim 4 in which said cooling step comprises cooling said sleeve with a fluid.

6. A method as set forth in claim 4 in which said cooling step comprises cooling said sleeve by immersing same in cold tap water.

7. A method of making endless power transmission belts each having a toothed outside surface and a toothed inside surface comprising the steps of, building a belt sleeve on a drum which has a toothed outside surface, extruding a polymeric material through an extrusion orifice to define a cylindrical curing jacket having a toothed inside surface around said sleeve with the teeth thereof disposed closely adjacent said sleeve, wherein the teeth comprising said toothed inside surface of said jacket extend parallel to the longitudinal axis of said jacket, curing said sleeve with said jacket therearound while subjecting the jacket to pressure such that the toothed outside surface of said drum defines corresponding inside teeth on said sleeve and such that the toothed inside surface of said jacket defines corresponding outside teeth on said sleeve, removing said jacket from around said drum and sleeve for reuse of said jacket, and cutting said sleeve to define said belts.

8. A method as set forth in claim 7 and further comprising the step of cooling said sleeve and jacket prior to removal of said jacket.

9. A method as set forth in claim 7 in which said building step comprises, placing a first polymeric layer on said drum, wrapping load-carrying means around said first polymeric layer, and placing a second polymeric layer around said first layer and load-carrying means.

10. A method as set forth in claim 9 in which said step of wrapping said load-carrying means around said first polymeric layer comprises helically winding a load-carrying cord against said first polymeric layer.

11. A method as set forth in claim 10 in which said curing jacket is made of a rubber compound.

12. A method as set forth in claim 11 in which said curing step comprises curing said sleeve with steam under controlled temperature and pressure, said steam under pressure urging said jacket against said sleeve to help define both said outside and inside teeth of said sleeve.

13. A method as set forth in claim 12 in which said cutting step comprises cutting said sleeve by providing a plurality of balanced cuts along the length thereof with said load-carrying cord being centrally disposed in said sleeve, said cuts defining belts of trapezoidal cross section such that alternate belts along the length of said sleeve upon being turned inside out are identical to the other belts along said sleeve.

* * * * *